(12) United States Patent
Benner et al.

(10) Patent No.: US 7,475,177 B2
(45) Date of Patent: Jan. 6, 2009

(54) TIME AND FREQUENCY DISTRIBUTION FOR BUFFERLESS CROSSBAR SWITCH SYSTEMS

(75) Inventors: Alan F. Benner, Poughkeepsie, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/044,756

(22) Filed: Jan. 27, 2005

(65) Prior Publication Data

US 2006/0168380 A1    Jul. 27, 2006

(51) Int. Cl.
G06F 13/00 (2006.01)
H04J 3/06 (2006.01)

(52) U.S. Cl. .................. 710/110; 714/22; 370/395.41; 370/477; 370/503

(58) Field of Classification Search ......... 710/316–317; 714/731, 744, 799; 713/178
See application file for complete search history.

(56) References Cited

U.S. PATENT DOCUMENTS

| | | | | |
|---|---|---|---|---|
| 5,115,331 | A | | 5/1992 | Goodkin et al. ............. 359/117 |
| 5,717,871 | A | | 2/1998 | Hsieh et al. ................. 395/250 |
| 5,758,054 | A | * | 5/1998 | Katz et al. .................... 714/22 |
| 5,822,381 | A | * | 10/1998 | Parry et al. .................. 375/356 |
| 5,896,516 | A | | 4/1999 | Powell, Jr. et al. .......... 395/312 |
| 5,991,295 | A | * | 11/1999 | Tout et al. ................ 370/395.7 |
| 6,021,457 | A | * | 2/2000 | Archer et al. ............... 710/260 |
| 6,370,159 | B1 | * | 4/2002 | Eidson ........................ 370/503 |
| 6,377,579 | B1 | * | 4/2002 | Ofek ........................ 370/395.4 |
| 6,563,837 | B2 | * | 5/2003 | Krishna et al. .............. 370/413 |
| 6,731,648 | B1 | * | 5/2004 | Cotter ........................ 370/458 |
| 6,771,596 | B1 | * | 8/2004 | Angle et al. ................. 370/229 |
| 6,801,536 | B1 | * | 10/2004 | Foster et al. ................. 370/412 |
| 6,865,154 | B1 | * | 3/2005 | Charny et al. ............... 370/235 |
| 6,931,576 | B2 | * | 8/2005 | Morrison et al. .............. 714/54 |
| 6,934,936 | B2 | * | 8/2005 | Clegg et al. ................. 717/127 |
| 6,961,342 | B1 | * | 11/2005 | Uzun et al. .................. 370/414 |
| 6,999,413 | B2 | * | 2/2006 | Moriwaki et al. ........... 370/228 |
| 7,006,518 | B2 | * | 2/2006 | Ornes et al. ................. 370/458 |
| 7,023,840 | B2 | * | 4/2006 | Golla et al. ................. 370/360 |
| 7,028,134 | B2 | * | 4/2006 | Wang et al. ................. 710/317 |
| 7,042,883 | B2 | * | 5/2006 | Fan et al. .................. 370/395.4 |
| 7,043,596 | B2 | * | 5/2006 | McWilliams et al. ........ 710/317 |
| 7,058,063 | B1 | * | 6/2006 | Cavendish ............. 370/395.41 |
| 7,142,555 | B2 | * | 11/2006 | Wang ......................... 370/429 |
| 7,206,327 | B2 | * | 4/2007 | Lorek et al. ................. 370/503 |
| 7,317,724 | B2 | * | 1/2008 | Koren et al. ................. 370/394 |
| 7,403,543 | B2 | * | 7/2008 | Lee et al. .................... 370/477 |
| 2001/0038628 | A1 | * | 11/2001 | Ofek et al. .................. 370/392 |
| 2002/0191626 | A1 | * | 12/2002 | Moriwaki et al. ........... 370/413 |

(Continued)

*Primary Examiner*—Paul R. Myers
*Assistant Examiner*—Brian T Misiura
(74) *Attorney, Agent, or Firm*—Cantor Colburn LLP; John Campbell

(57) ABSTRACT

A bufferless crossbar switch system and technique for synchronization and error recovery between switch line cards is provided. A network switches data through the bufferless data crossbar switch and distributes a high-speed frequency and time signal on a separate channel. The separate channel allows clock recovery, eliminating the need to encode the data in a way that allows clock recovery. The separate channel also gives a global picture of time so that a system can be globally scheduled by notifying ingress and egress line card adapters when to perform specific actions, such as transmitting or receiving data or retransmitting data for error recovery.

15 Claims, 3 Drawing Sheets

U.S. PATENT DOCUMENTS

| | | | |
|---|---|---|---|
| 2003/0048792 A1* | 3/2003 | Xu et al. | 370/400 |
| 2003/0115401 A1 | 6/2003 | Herr | 710/317 |
| 2003/0123468 A1* | 7/2003 | Nong | 370/412 |
| 2003/0123469 A1* | 7/2003 | Nong | 370/412 |
| 2003/0179759 A1* | 9/2003 | Wang | 370/399 |
| 2005/0030978 A1* | 2/2005 | Dropps et al. | 370/512 |
| 2005/0117575 A1* | 6/2005 | Konda | 370/389 |
| 2006/0153179 A1* | 7/2006 | Ho et al. | 370/386 |
| 2006/0165080 A1* | 7/2006 | Benner et al. | 370/390 |
| 2006/0165081 A1* | 7/2006 | Benner et al. | 370/390 |
| 2006/0168380 A1* | 7/2006 | Benner et al. | 710/110 |
| 2006/0171381 A1* | 8/2006 | Benner et al. | 370/386 |

* cited by examiner

TIME AND FREQUENCY DISTRIBUTION FOR BUFFERLESS CROSSBAR SWITCH SYSTEMS

BACKGROUND OF THE INVENTION

1. Field of the Invention

The present invention relates generally to network computing, data coding and encoding, and, in particular, to a global time and frequency distribution for optical or electronic packet-switching or burst-switching crossbar networks with synchronization-based error reporting and correction.

2. Description of Related Art

There is a need for a synchronous extension that offers advantages for clustered computing architectures. Synchronous processing is also desirable for cases where the data traffic comes in short bursts, since clock synchronization facilitates error detection and recovery.

A first problem with conventional crossbar switch interconnection systems is clock distribution and clock synchronization between the multiple line cards. As data is transmitted from each line card ingress element to each line card egress element, the circuits in each card must be clocked at identical frequencies to allow recovery of the data from the analog transmitted optical or electrical signal. In the past, this switch-global frequency distribution has been typically accomplished with a copper-distributed low-frequency oscillator, which is locally multiplied up to the higher data transmission frequency in each card. However, as data transmission bitrates rise to 10 Gb/s, 40 Gb/s, and even 100 Gb/s, a much better method for distributing a low-jitter, high precision clock across the system is needed.

A second problem with conventional crossbar switch interconnection systems is data integrity. As data transmissions rates rise above the 10 Gb/s level, there is increasing difficulty transmitting and receiving data without data errors. A more robust error detection and recovery method is needed. A standard method for error recovery is to label each packet of data with a unique identifying sequence number so that when a packet is corrupted, the destination can notify the source that the packet wasn't received. These sequence numbers and acknowledgment mechanisms require extra overhead that degrades the usable throughput of the network. There is a need for a globally distributed and synchronized clock mechanism for allowing error detection and recovery without the overhead of sequence numbers and explicit packet acknowledgments.

BRIEF SUMMARY OF THE INVENTION

The present invention is directed to methods, systems, and storage mediums for global time and frequency distribution and error recovery for bufferless switch interconnection systems.

One aspect is a method for time and frequency distribution for bufferless data crossbar switch systems. A global clock signal is distributed over a separate channel to a number of line cards or adapters. Data from the line cards or adapters is switched through a bufferless data crossbar switch. The data is encoded with a time value from the global clock signal. The time value is used for scheduling and for performing error detection and error recovery. Another aspect is a storage medium stores instructions for performing this method.

Yet another aspect is a system for time and frequency distribution, including a number of line cards, a bufferless data crossbar switch, and a centralized broadcast network. The adapters each have an ingress element, an egress element, and a partial scheduler. The bufferless switch is connected by data path links to the ingress and egress elements. The centralized broadcast network is connected by control links to each line card for distributing a global clock signal incorporating time and frequency information for synchronization and error recovery. Select data is uniquely identified with respect to the global clock signal.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Methods, systems, and storage mediums for time and frequency distribution for bufferless switches are described. Systems with such switches include line cards or adapters, a bufferless crossbar switch, a device or system for scheduling traffic between the line cards through the bufferless crossbar switch and a mechanism for synchronization and error recovery.

Figure 1:
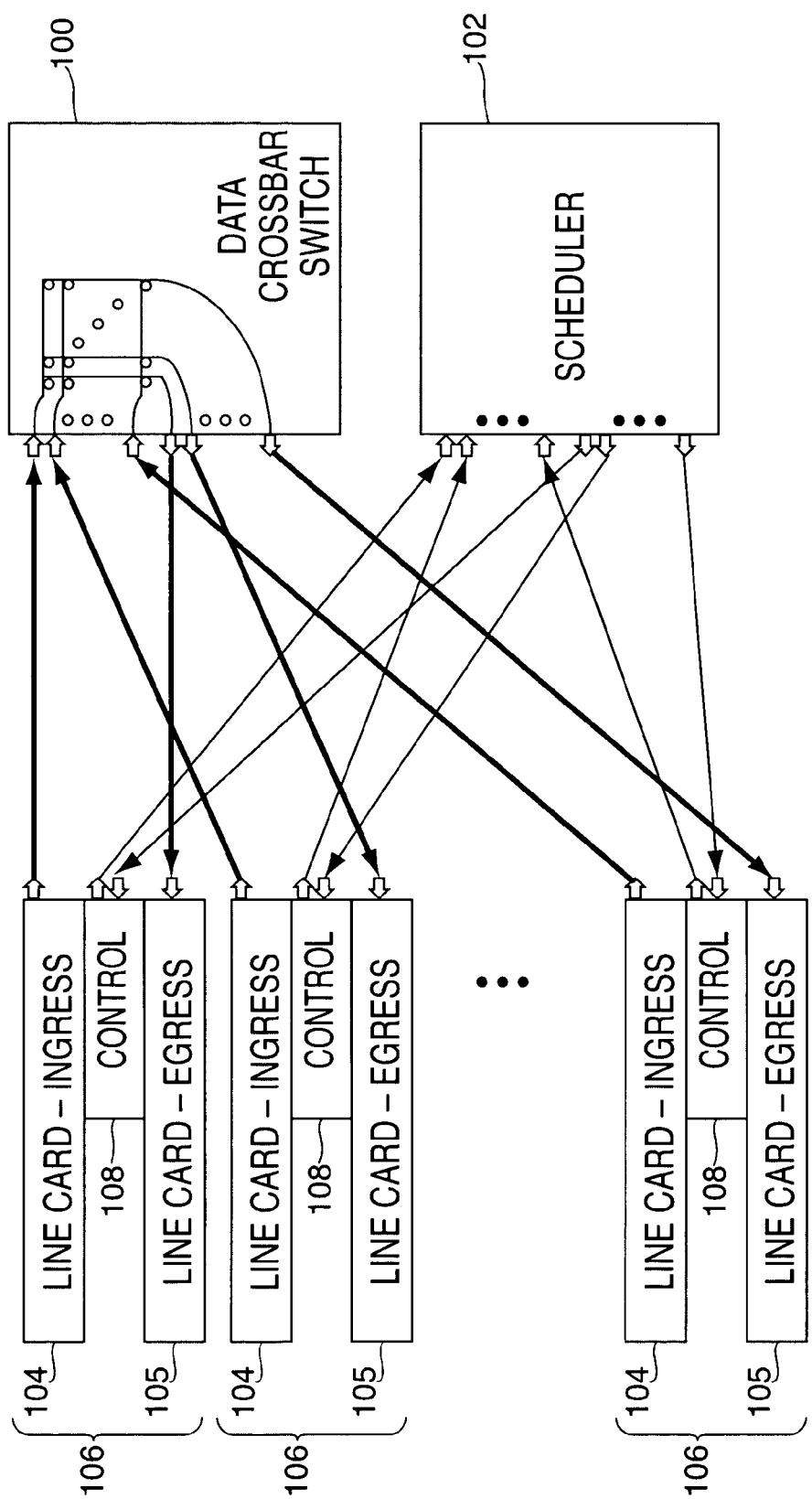
FIG. 1 is a block diagram showing a prior art bufferless crossbar switch system with an associated scheduler.

FIG. 1 shows a prior art bufferless crossbar switch system that includes a data crossbar switch 100 and a scheduler 102, line cards 106 each having an ingress element 104 and an egress element 105 and control logic 108. The scheduler 102 manages traffic flow through the data crossbar switch 100.

The data crossbar switch 100 may be implemented using a variety of known technologies. For example, one way the data crossbar switch 100 may be implemented is as an electronic switch using standard complementary metal-oxide semiconductor (CMOS) or bipolar transistor technology implemented in silicon or other semiconductor materials. A second way the data crossbar switch 100 may be implemented is as an electronic switch using superconducting material. A third way to implement the data crossbar switch 100 is as an optical switch using beam-steering on multiple input beams. A fourth way is as an optical switch using an array waveguide grating, which diffracts different wavelengths of light to different output ports in conjunction with tunable input lasers. Many other technologies may be used to implement the functionality of the data crossbar switch 100 and this list is not limiting. The exemplary embodiments apply to any type of crossbar switch technology. Some exemplary embodiments described herein are implemented with optical switching technology, however all forms of data crossbar switch 100 are encompassed with the scope of the present invention.

Figure 2:
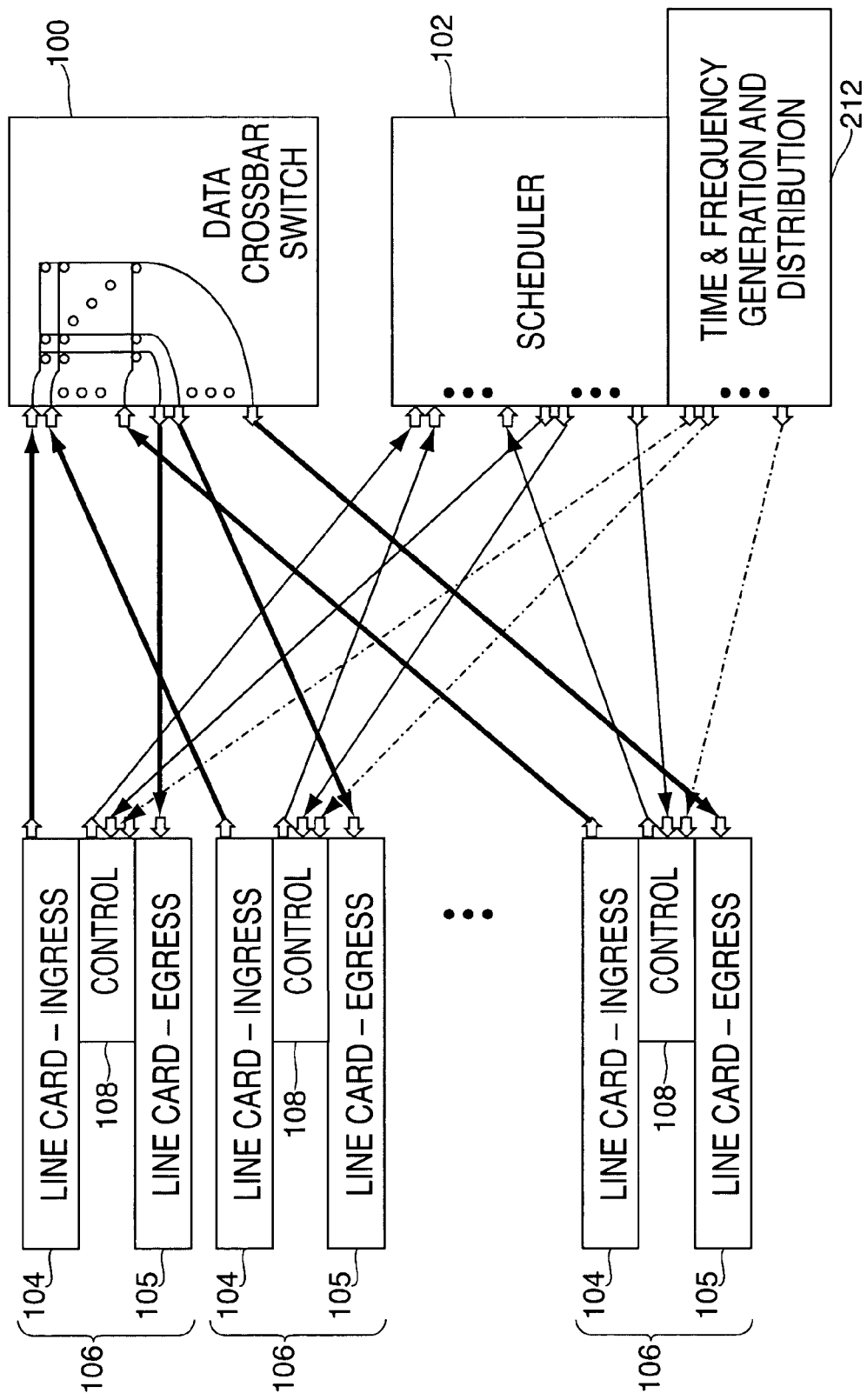
FIG. 2 is a block diagram showing an exemplary embodiment of a bufferless crossbar with an associated scheduler and an associated global time and frequency generation and distribution network.

FIG. 2 shows an exemplary embodiment of a bufferless crossbar with an associated scheduler and an associated global time and frequency generation and distribution network 212. There are links for transporting data (thick solid lines), for transporting control information (thin solid lines) as in FIG. 1 and, in addition, links for transporting global time and frequency information (dotted lines) to all the line cards approximately simultaneously. Clock (i.e., time and frequency) generation avoids having to encode the data in a way that allows frequency recovery from the transmitted data. The common global synchronization of time and frequency information allows the system to be globally scheduled by instructing the line cards when to do specific actions.

A second fiber is the same as a broadcast fiber used to distribute to all the nodes their schedule of crossbar connection times. That is, a schedule needs to be broadcast to all the nodes, showing which inputs send which data to which outputs. This pattern is encoded in such a way that a global clock and time value can be derived from it by, for example, using 8/10 overhead or similar means. Then, the data channels do not need to be coded and there is no need to implement frequency recovery, only phase recovery as in an optical clock distribution scheme.

It is clear to one skilled in the art that the time and frequency information transmitted though the links shown with dotted lines in FIG. 2 may be multiplexed with the control information transmitted over the links shown with thin solid lines. Such an exemplary embodiment removes the need for the links shown with dotted lines, but requires more bandwidth available over the control information lines. This exemplary embodiment is within the scope of the present invention.

With conventional packet switch interconnect systems using data crossbar switches, sending and receiving line cards identify packets for error recovery by a common understanding of unique sequence numbers in the packets. However, with an exemplary embodiment of an optical crossbar switch, senders and receivers have a common understanding of the time that is consistent across the network. Any receivers receiving bad data are able to report corrupted data by reporting the time that the corrupted packet arrives.

In this exemplary embodiment, the receiver notifies the global controller/scheduler of the time that the corrupted data was received and the controller determines from the record which source was transmitting to it at that time. The controller requests that the sender re-transmit the data sent at that time. In this way, recovery from errors in data transmission is easier than using conventional systems.

In this exemplary embodiment, the data packets are uniquely and consistently identified by a synchronous approach. Each data packet is identified by the global time at which it was sent or received by a line card, without any sequence number fields included in the packet headers or trailers. This saves link overhead and, further, does not require each source to keep a sequence number per destination, and does not require each destination to keep a sequence number per source.

This exemplary method allows synchronous error recovery. Furthermore, the exemplary switch control method is able to retrieve an arbitrary number of connections back in time to address recurring error patterns, so long as the data is still stored.

Some exemplary system embodiments include clusters, parallel processing computers, InfiniBand™ Networks, high performance computers, supercomputers, and other computing machines. Other exemplary embodiments include switches, routers, clustering switches, high-performance cluster switches, switch clustering fabrics, and other devices and combinations of devices. One exemplary embodiment is adapted to support Sysplex timing protocols over InfiniBand™ links in servers. Some exemplary embodiments include switches that have InfiniBand™ or Ethernet interfaces.

An exemplary embodiment includes a crossbar switch design with clock distribution and synchronization between the switch line cards. A clock signal is distributed to each node so that data does not need to be encoded in such a way as to permit clock recovery by the node logic. There is a global time stamp so that data can be scheduled with respect to a time reference. Each card can be clocked at the same time with greater accuracy than by using distributed clocks on each card with local oscillators. There is improved data integrity on high data rate links (e.g., greater than 10 Gbit/s) by enabling sequence numbers (time stamps) to be applied to the data transactions with reference to a global time stamp to facilitate error recovery for corrupted packets, without requiring the overhead of sequence numbers applied to the separate data packets. A synchronous time of day processing such as that used in a parallel Sysplex architecture over InfiniBand or similar communication links is included. There is improved performance for cases where data traffic comes in short bursts, because clock synchronization facilitates error detection and recovery. There is a common time reference for multiple switch ports, facilitating synchronous disaster recovery in computer networks. This exemplary embodiment is applicable to InfiniBand switches as well as large data center clustered computing applications and may be implemented with a combination of hardware and software.

Figure 3:
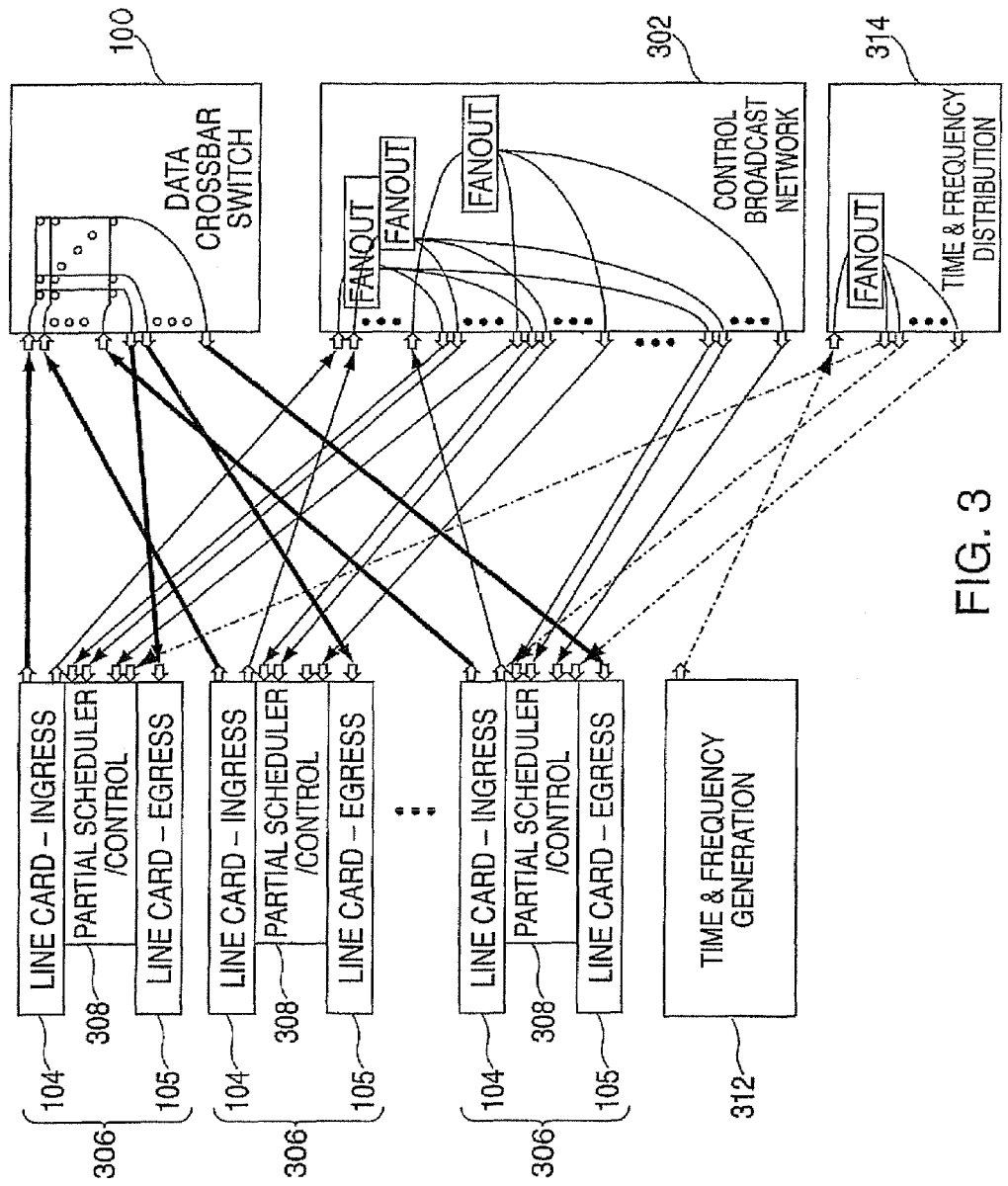
FIG. 3 is a block diagram showing an exemplary embodiment of a replicated distributed responseless switch interconnection system incorporating a bufferless crossbar switch, a control broadcast network, a time and frequency generating element and a time and frequency distribution network for replicating elements of the control broadcast network.

FIG. 3 shows an exemplary embodiment of a replicated distributed responseless switch interconnection system incorporating a data crossbar switch 100, a control broadcast network 302, a time and frequency generating element 312 and a time and frequency distribution network 314 that replicates elements of the control broadcast network. Data is switched between line cards or adapters 306 that each include an ingress element 104 and an egress element 105 and a partial scheduler 308. The partial scheduler 308 schedules traffic for each line card 306, incorporating control information from all the line cards 306 distributed through the control broadcast network 302.

The exemplary embodiments of the present invention have many advantages. One exemplary embodiment is a mechanism for a synchronous extension of the replicated distributed responseless crossbar switch that offers advantages for clustered computing architectures. Synchronous processing is also desirable for cases where the data traffic arrives in short bursts, since clock synchronization facilitates error detection and recovery. Exemplary embodiments allow easier clock recovery and provide global time stamp information for switch traffic. One exemplary embodiment provides a clock signal distributed to each node so that data does not need to be encoded in such a way as to permit clock recovery by node logic. Another exemplary embodiment provides a global time stamp so that data can be scheduled with respect to a time reference (i.e., instruct each I/O card when to perform specific actions). This improves reliability and eliminates a single point of failure associated with a central scheduler.

Additional advantages include better performance and accuracy of clock distribution than conventional systems. In one exemplary embodiment, each card is clocked at the same time, providing greater accuracy than achieved by using distributed clocks on each card with local oscillators. Exemplary embodiments provide better data integrity on high data rate links (e.g., greater than about 10 Gbit/s) by determining sequence of the data transactions with reference to a global time stamp, without requiring the overhead of sequence numbers applied to separate data packets. This also facilitates error recovery for corrupted packets.

Further advantages include exemplary embodiments where the data packets are uniquely and consistently labeled in a synchronous approach, without any built-in sequence number fields included in the packet headers or trailers. This saves overhead. Sources need not keep a sequence number per destination, nor do destinations need to keep a sequence number per source. Some exemplary embodiments include mechanisms for a synchronous extension of a replicated distributed responseless crossbar switch, which offers advantages for clustered computing architectures. Synchronous processing is also desirable for cases where data traffic comes in short bursts, because clock synchronization facilitates error detection and recovery. Exemplary embodiments including crossbar switch designs with clock distribution and synchronization between the switch line cards allow easier clock recovery and provide global time stamp information for all the switch traffic.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code. For example, whether stored in a storage medium, loaded into and/or executed by a computer, or transmitted over some transmission medium, such as over electrical wiring or cabling, through fiber optics, or via electromagnetic radiation, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for time and frequency distribution for bufferless data crossbar switch systems, comprising:
    distributing a global clock signal in a clustered computing system over a separate channel to a plurality of line cards or adapters including a sending line card or adapter and a receiving line card or adapter;
    switching, through a bufferless data crossbar switch, data from the sending line card or adapter, the data being encoded with a time value from the global clock signal, the data comprising a plurality of data packets each uniquely and consistently labeled in a synchronous manner, without any built-in sequence number fields being included in a packet header, and without any built-in sequence number fields being included in a packet trailer;
    scheduling using the time value by generating a schedule for instructing each of the plurality of line cards or adapters as to when a specific action is to be performed, wherein the specific action comprises specifying one or more of a plurality of inputs of each of the plurality of line cards or adapters that are to be switched to one or more of a plurality of outputs of each of the plurality of line cards at each of a plurality of scheduled times;
    encoding the schedule in such a way that the global clock signal and the time value can be derived from the schedule; and
    performing error detection and error recovery using the time value, wherein if the data is corrupt as received by the receiving line card or adapter, the time value is used to initiate a retransmission of the data from the sending line card or adapter.

2. The method of claim 1, wherein the distributing is performed using a time and frequency distribution network to replicate the global clock signal for the plurality of line cards or adapters.

3. The method of claim 2, wherein scheduling includes scheduling crossbar connection times.

4. The method of claim 1, wherein data packets are identified by the time transmitted, rather than by sequence numbers.

5. The method of claim 1, wherein the separate channel is connected from adapter to adapter or from line card to line card for distributing the global clock signal to the adapters.

6. The method of claim 1, wherein a control broadcast network is connected to each line card or adapter for distributing the global clock signal to the line cards or adapters.

7. A system for time and frequency distribution, comprising:
    a plurality of line cards including a sending line card and a receiving line card, each line card having an ingress element, an egress element, and a partial scheduler;
    a bufferless data crossbar switch connected by data path links to the ingress and egress elements; and
    a centralized broadcast network connected by control links to each line card and connected on a separate channel to each line card for distributing a global clock signal incorporating time information for synchronization and error recovery in a clustered computing system; the centralized broadcast network generating a schedule for instructing each of the plurality of line cards as to when a specific action is to be performed, wherein the specific action comprises specifying one or more of a plurality of inputs of each of the plurality of line cards that are to be switched to one or more of a plurality of outputs of each of the plurality of line cards at each of a plurality of scheduled times; the centralized broadcast network encoding the schedule in such a way that the global clock signal and the time value can be derived from the schedule;
    wherein select data is uniquely identified with respect to the global clock signal such that, if the select data is corrupt as received by the receiving line card, the time information is used to initiate a retransmission of the select data from the sending line card, the select data comprising a plurality of data packets each uniquely and consistently labeled in a synchronous manner, without any built-in sequence number fields being included in a packet header, and without any built-in sequence number fields being included in a packet trailer.

8. The system of claim 7, wherein the global clock signal clocks each of the plurality of line cards substantially simultaneously.

9. The system of claim 7, wherein the centralized broadcast network comprises a time and frequency distribution network for replicating the global clock signal for the plurality of line cards or adapters.

10. The system of claim 7, wherein the centralized broadcast network broadcasts scheduling information over the separate channel.

11. The system of claim 10, wherein the scheduling information includes crossbar connection times.

12. The system of claim 7, wherein error detection and recovery is performed using the time information, and the time information is provided in the form of a time stamp.

13. The system of claim 7, wherein the time information is provided in the form of a time stamp, and the time stamp is used in place of sequence numbers.

14. The system of claim 7, wherein the centralized broadcast network is connected by control links to the ingress element and the egress element of each line card and connected on the separate channel to the partial scheduler of each adapter.

15. A storage medium storing instructions for performing a method for time and frequency distribution for bufferless crossbar switch systems, the method comprising:

distributing a global clock signal in a clustered computing system over a separate channel to a plurality of line cards or adapters including a sending line card or adapter and a receiving line card or adapter;

switching, through a bufferless data crossbar switch, data from the sending line card or adapter, the data being encoded with a time value from the global clock signal, the data comprising a plurality of data packets each uniquely and consistently labeled in a synchronous manner, without any built-in sequence number fields being included in a packet header, and without any built-in sequence number fields being included in a packet trailer;

scheduling using the time value by generating a schedule for instructing each of the plurality of line cards or adapters as to when a specific action is to be performed, wherein the specific action comprises specifying one or more of a plurality of inputs of each of the plurality of line cards or adapters that are to be switched to one or more of a plurality of outputs of each of the plurality of line cards at each of a plurality of scheduled times;

encoding the schedule in such a way that the global clock signal and the time value can be derived from the schedule; and performing error detection and error recovery using the time value, wherein if the data is corrupt as received by the receiving line card or adapter, the time value is used to initiate a retransmission of the data from the sending line card or adapter.

* * * * *